(12) United States Patent
Kelly

(10) Patent No.: US 7,117,292 B2
(45) Date of Patent: Oct. 3, 2006

(54) APPARATUS AND METHOD TO SWITCH A FIFO BETWEEN STROBE SOURCES

(75) Inventor: James D. Kelly, Scotts Valley, CA (US)

(73) Assignee: Broadcom Corporation, Irvine, CA (US)

( * ) Notice: Subject to any disclaimer, the term of this patent is extended or adjusted under 35 U.S.C. 154(b) by 111 days.

(21) Appl. No.: 10/822,394

(22) Filed: Apr. 12, 2004

(65) Prior Publication Data

US 2004/0193823 A1    Sep. 30, 2004

Related U.S. Application Data

(63) Continuation-in-part of application No. 10/269,913, filed on Oct. 11, 2002.

(60) Provisional application No. 60/511,033, filed on Oct. 14, 2003.

(51) Int. Cl.
*G11C 7/22* (2006.01)
*G06F 1/04* (2006.01)
(52) U.S. Cl. .................... 711/5; 365/192; 713/500
(58) Field of Classification Search ............. 711/154, 711/167; 710/14, 25, 52, 58, 60
See application file for complete search history.

(56) References Cited

U.S. PATENT DOCUMENTS

| | | | | |
|---|---|---|---|---|
| 5,522,064 A | * | 5/1996 | Aldereguia et al. | 713/501 |
| 5,761,464 A | * | 6/1998 | Hopkins | 710/310 |
| 5,761,478 A | * | 6/1998 | Chen et al. | 711/172 |
| 5,768,560 A | * | 6/1998 | Lieberman et al. | 711/167 |
| 5,956,524 A | * | 9/1999 | Gajjar et al. | 710/62 |
| 6,085,285 A | * | 7/2000 | Lucas et al. | 711/112 |
| 6,385,674 B1 | * | 5/2002 | Gajjar et al. | 710/62 |
| 6,529,988 B1 | * | 3/2003 | Yoshikawa et al. | 710/305 |
| 2003/0053367 A1 | * | 3/2003 | Condorelli et al. | 365/239 |
| 2003/0088611 A1 | * | 5/2003 | Gajjar et al. | 709/202 |
| 2005/0005183 A1 | * | 1/2005 | Nobunaga | 713/401 |

OTHER PUBLICATIONS

DDR Update:JEDEC Changes and Micron's Technical Note TN-46-01; Micron Technology; 2000; 3 pages; http://download.micron.com/pdf/pubs/designline/DL92b.pdf.
DDR SDRAM Functionality and Controller Read Data Capture; Micron Technology; 1999; 24 pages; http://download.micron.com/pdf/pubs/designline/dl399.pdf.
PCT Search Report for corresponding PCT application performed by European Patent Office dated Aug. 24, 2004.

* cited by examiner

*Primary Examiner*—Jesse Diller
(74) *Attorney, Agent, or Firm*—Garlick Harrison & Markison

(57) ABSTRACT

A first-in, first-out (FIFO) unit switches between strobe sources. The FIFO uses a multiplexer to switch between two or more strobes so that different data strobes may be used with the FIFO to strobe in the data. In one implementation, the FIFO uses four data latches to strobe in data bits and output a pair of data bits onto the internal bus each half clock cycle.

18 Claims, 6 Drawing Sheets

300

| BIT | DQS$_8$ | DQS$_9$ |
|---|---|---|
| 0 | DQS0 | DQS0 |
| 1 | DQS0 | DQS0 |
| 2 | DQS0 | DQS0 |
| 3 | DQS0 | DQS0 |
| 4 | DQS0 | DQS0 |
| 5 | DQS0 | DQS0 |
| 6 | DQS0 | DQS0 |
| 7 | DQS0 | DQS0 |
| 8 | DQS1 | DQS0 |
| 9 | DQS1 | DQS1 |
| 10 | DQS1 | DQS1 |
| 11 | DQS1 | DQS1 |
| 12 | DQS1 | DQS1 |
| 13 | DQS1 | DQS1 |
| 14 | DQS1 | DQS1 |
| 15 | DQS1 | DQS1 |
| 16 | DQS2 | DQS1 |
| 17 | DQS2 | DQS1 |
| 18 | DQS2 | DQS2 |
| 19 | DQS2 | DQS2 |
| 20 | DQS2 | DQS2 |
| 21 | DQS2 | DQS2 |
| 22 | DQS2 | DQS2 |
| 23 | DQS2 | DQS2 |
| 24 | DQS3 | DQS2 |
| 25 | DQS3 | DQS2 |
| 26 | DQS3 | DQS2 |
| 27 | DQS3 | DQS3 |
| 28 | DQS3 | DQS3 |
| 29 | DQS3 | DQS3 |
| 30 | DQS3 | DQS3 |
| 31 | DQS3 | DQS3 |
| 32 | DQS4 | DQS3 |
| 33 | DQS4 | DQS3 |
| 34 | DQS4 | DQS3 |
| 35 | DQS4 | DQS3 |
| 36 | DQS4 | X |
| 37 | DQS4 | X |
| 38 | DQS4 | X |

APPARATUS AND METHOD TO SWITCH A FIFO BETWEEN STROBE SOURCES

CROSS REFERENCE TO RELATED APPLICATION

The present application is a continuation-in-part of and claims priority under 35 U.S.C. 120 to U.S. Utility Patent Application entitled MEMORY CONTROLLER CONFIGURABLE TO ALLOW BANDWIDTH/LATENCY TRADEOFF, having an application Ser. No. 10/269,913, and a filing date of Oct. 11, 2002, which is incorporated herein by reference.

This application also claims the benefit of U.S. Provisional Patent Application entitled APPARATUS AND METHOD TO SWITCH A FIFO BETWEEN STROBE SOURCES, having an application No. 60/511,033 and a filing date of Oct. 14, 2003, which is incorporated herein by reference.

BACKGROUND OF THE INVENTION

1. Technical Field of the Invention

The embodiments of the invention relate to storage circuits and, more particularly, to a scheme to switch a data FIFO device between strobe sources.

2. Description of Related Art

Generally, when data acquisition entails the input of data from a data source of one domain and transfer of that data into a second domain, some mechanism may be employed to operate as an interim transfer mechanism or an interface between the data source and destination. The data interface medium may be in the form of flip-flops, latches, buffers, registers, memories, etc. In one instance, a data FIFO (first-in, first-out) unit may be utilized to receive the data from one operating domain and to output the data based on a timing associated with a second domain. In one example, data from a memory device is sourced to a FIFO unit under control of strobe signals that operate with the corresponding timing signals associated with the memory device. Typically, the timing strobes utilized for clocking the data into the FIFO unit correspond to the particular memory device operably coupled to the FIFO unit to transmit the data to the FIFO unit.

In practice, when a particular memory device is selected for use as a data storage medium for a system, the memory device may have certain attributes to operate within the system. Thus, a processor, bus, memory controller, and/or other devices may dictate a particular type of memory to be utilized within the system. Or, alternatively, a particular memory is chosen and its attributes are employed to configure the system which operates with that particular memory. For example, if a particular memory employs an 8-bit data transfer for a strobe, then the system is generally configured to operate to accommodate the 8-bits per strobe. However, if the particular memory operates using a 9-bit data transfer scheme, then 9 bits of data are transferred for a given strobe and the system is configured to operate to accommodate the 9-bit bus.

In a typical application, a given system employs one type of memory configuration. In the above example, the system may operate with either an 8-bit data transfer per strobe or a 9-bit data transfer per strobe for data transfer from memory. It would be advantageous to have a flexible system, so that the system may operate with different strobing configurations to allow different types of memory devices to be selected and/or employed to operate within the system.

SUMMARY OF THE INVENTION

An apparatus and method to switch a first-in, first-out (FIFO) buffer between strobe sources. In one embodiment, a FIFO is coupled to receive data from a memory. The FIFO uses a multiplexer to switch between two or more strobes so that different data strobes may be used. By allowing for more than one data strobe to be used by the FIFO to switch in data, different strobing rates may be employed to allow flexibility in the memory being selected.

In one embodiment, the FIFO is implemented within an integrated circuit. The FIFO receives data from an external memory and transfers the data onto an internal bus of the integrated circuit. The FIFO uses four data latches to latch in the strobed data bits and output a pair of data bits onto the internal bus each half clock cycle.

DETAILED DESCRIPTION OF THE EMBODIMENTS OF THE INVENTION

The embodiments of the present invention may be practiced in a variety of settings that implement a strobe signal to clock data from a memory device into an interim data storage device. In one embodiment of the invention, a data FIFO (first-in, first-out) unit receives incoming data from a memory and operates as an interim data storage device to make the data available for use by a system. The FIFO establishes proper timing for the data to be output onto a data path. In one embodiment, the FIFO is internal within an integrated circuit (IC) that includes other components of the system, and the data output from the FIFO is made available on an internal bus of the IC. Typically, with this example, the memory device utilized for data storage is external to the IC. In the described embodiments, the FIFO switches between strobes allowing for different strobe configurations to be selected based on the type of memory utilized.

It is to be noted that the invention may be adapted for use in a variety of devices, integrated circuits (ICs), systems, etc, than the particular example embodiments described below. The example embodiments described below pertain to a data FIFO used as a buffer to receive data from memory and to transfer the data onto an internal data path of an IC device. It is to be noted that the examples given below are for explaining the invention and not for limiting the practice of the invention. It is also to be noted that although a FIFO buffer is described, various other storage devices may be used to strobe in the data.

Figure 1:
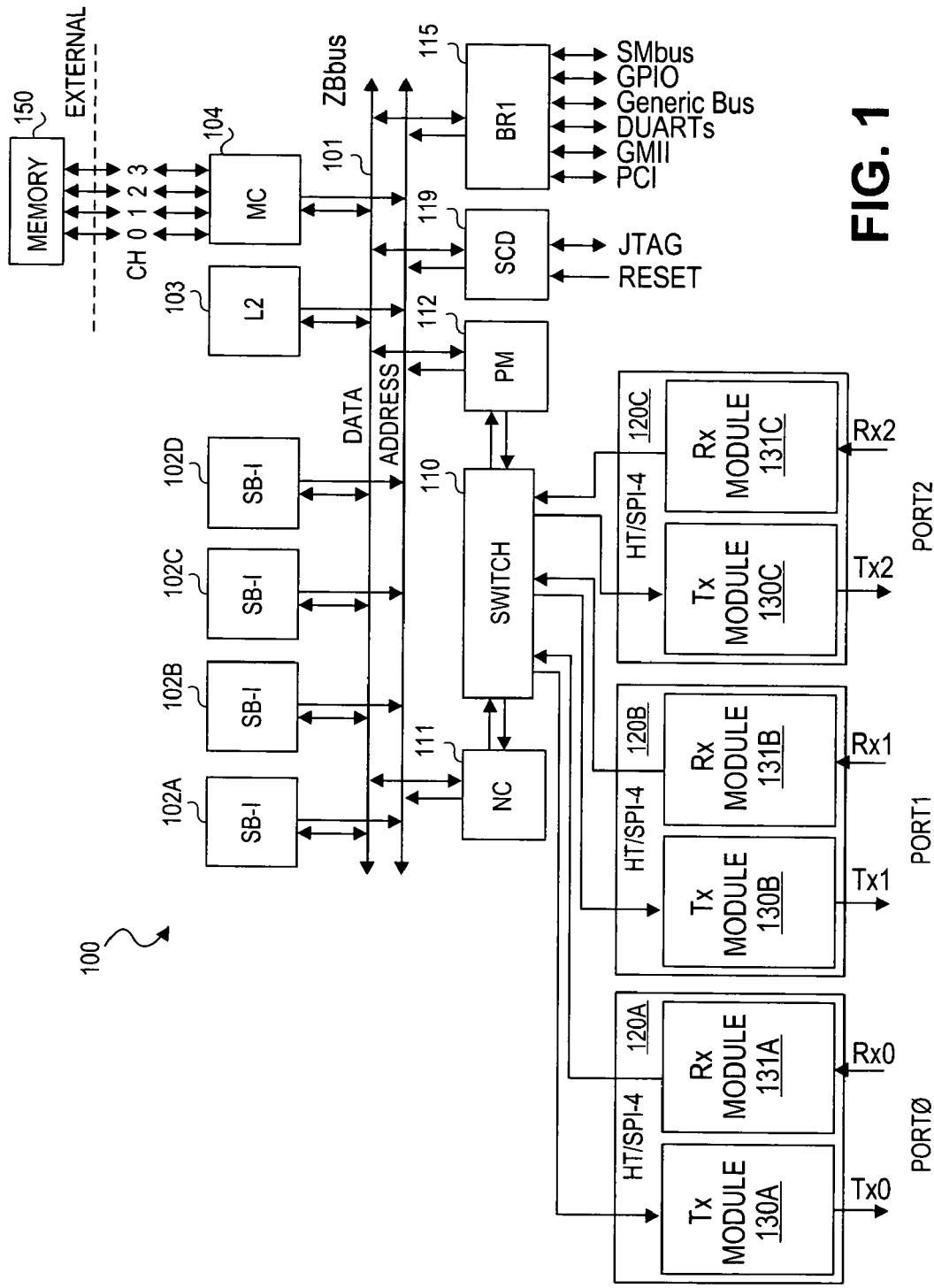
FIG. 1 is a block schematic diagram of an example system in which an embodiment of the invention is implemented in an integrated circuit having multiple processors and various other devices for data processing.

Referring to FIG. 1, an example processing device (referred to as a system 100) is illustrated in which a number of various units are operably coupled to one another through a bus. The various units of system 100 may be part of a single integrated circuit (IC) or the units may be embodied in separate ICs. In the particular embodiment of FIG. 1, the units shown may be constructed within a single IC so that the IC provides a complete system-on-a-chip solution that includes one or more processors, memory controller, network, input/output (I/O) interface and data interface to provide a scalable, cache-coherent, distributed shared memory system. Thus, bus 101 (also referred to as a ZB bus) in the particular example is an internal bus of an IC. The example system 100 is shown having four separate processors 102A–D. However, other embodiments of system 100 may operate with a single processor or any number of multiple processors. The example system 100 may operate in various applications including, packet processing, exception processing, switch control and management, higher layer of switching and filtering, application and computer servers, storage switches and systems, protocol conversion, and VPN (virtual private network) access, firewalls and gateways.

Other than the processors 102 (also noted as SB-1), system 100 includes a level 2 (L2) cache 103 to operate with a level 1 (L1) cache, which is present in individual processors 102. Processors 102 and cache 103 are operably coupled to the ZB bus. System 100 also includes a memory controller 104, switch 110, node controller 111, a packet manager 112, a bridge unit 115 and a system controller and debug (SCD) unit 119.

In the example system 100, processors 102 operate utilizing a particular instruction set architecture. Although the processors may be designed to operate utilizing the IA-32 or IA-64 instruction set architecture of Intel Corporation or the power PC instruction set, as well as others, processors 102 in the particular example comprise four low-power, superscaler 64-bit MIPS compatible processors with separate instruction and data caches. Processors 102 are coupled to the ZB bus 101, which in one embodiment is a high-performance, on-chip, cache-coherent internal bus. In one embodiment, the high-performance ZB bus operates as a 128 Gbps bus. The ZB bus is a cache-line wide (256 bits), split-transaction, cache-coherent bus which interconnects the various other units or modules shown in FIG. 1. In the particular embodiment, the ZB bus operates at half the processor core clock frequency for a bandwidth of 128 Gbps at 500 Megahertz. The bus has separate address, data, and control sections. The address and data sections are arbitrated separately to allow for a high bus utilization. The ZB bus supports a MESI protocol that helps maintain cache-coherency between the L1 caches, L2 cache and the I/O bridge, packet manager and node controller.

One or more of the SB-1 processors 102 may be a quad issue, in order execution, processor that implements the MIPS 64 architecture. The SB-1 core may include hardware support for floating-point processing and branch prediction. SB-1 memory subsystem may include a 32 KB, 4-way associative, virtually-indexed and virtually-tagged instruction cache in a 32 KB, 4-way set associative, physically-indexed and physically-tagged data cache. In the particular embodiment, the cache line is 32 bytes wide. This provides the SB-1 processor with a large, fast, on-chip memory. A bus interface unit within processor 102 couples the memory subsystem to the ZB bus and L2 cache 103 for main memory access and maintains cache coherency along with the ZB bus.

The L2 cache, which is also coupled to the ZB bus, may be a 1 MB on-chip second level cache that may be shared by the four SB-1 processor. The L2 cache may also be shared by the node controller 111, packet manager 112 and any I/O DMA (direct memory access) master. In the particular embodiment, the L2 cache may be organized into 32-byte cache lines with 8-way set associativity. Accesses to the L2 cache may be in full cache blocks. The L2 cache may be a non-inclusive/non-exclusive cache, thus there are no restrictions on which cache blocks may be in the L2. A random replacement policy may be used when a victim line is to be found. The L2 cache may run internally at the CPU core speed and may be fully pipelined. The L2 cache may be physically one of the ZB bus agents, but architecturally the L2 cache sits between the system bus and the main memory and there may be dedicated signals between the L2 and memory controller 104. In an alternative embodiment, aside for the normal operation of the L2 cache, a mode may exist where banks of the L2 cache may be used as an on-chip SRAM (static random access memory).

Memory controller (MC) 104 is a controller that works closely with the L2 cache to provide a high-performance memory system. Although the number of channels may vary depending on the memory controller and the system employed, the particular MC 104 in the embodiment of FIG. 1 includes four data channels, illustrated as channels 0–3, in which a given data channel provides a 32-bit data path with 7-bit ECC (error correction code) for a total of 39 bits. MC 104 is typically coupled to a memory or memories, which may reside on the IC or may be located external to the IC chip. In the particular example shown in FIG. 1, MC 104 is coupled to an external memory 150 that operates as a main memory for the system 100.

A variety of memory devices may be controlled by MC 104, including synchronous dynamic random access memory (SDRAM) and double date rate (DDR) SDRAMS. Furthermore, pairs of channels may be ganged together to form up to two 64-bit channels with 8-bit ECC. In one embodiment, MC 104 may directly support up to eight standard, two-bank 184-pin DDR DIMMs (double inline memory modules) running at approximately 133 MHz and allows for performance to increase as the DIMMs support higher data rates. The peak memory bandwidth for a ganged 64-bit channel using standard (133 MHz clock) DIMMs may be 34 Gbps and may also increase up to 102 Gbps for a high-speed (400 MHz clock) design using all channels. A given 32-bit channel of MC 104 may support up to 512 MB of memory using 256-Mbit technology parts. As larger DRAMS become available the capacity may increase up to and beyond 1 GB with 512 Mbit parts and beyond 2 GB with 1 Gbit parts for a total of 8 GB across all four channels. Furthermore, special large memory mode may be utilized to increase the size of the memory further when MC 104 is used in conjunction with an external decoder.

The switch 110 may be utilized to switch and route data through either node controller (NC) 111 or packet manager (PM) 112. In the particular example system 100 of FIG. 1, three high-speed HT/SPI-4 ports (identified as Port0, Port1 and Port2) coupled to respective HT/SPI-4 interfaces 120A–C. Interfaces 120A–C transmit and/or receive HT and/or SPI data using HT and/or SPI-4 protocol. Switch 110 receives data from interfaces 120A–C and internally segments the received SPI packets and HT transactions for routing to either NC 111 or PM 112. Similarly, when transmitting data, switch 110 receives SPI packet data or HT transactions from either NC 111 or PM 112 and routes it to one of the interfaces 120A–C. Node controller 111 transfers HT and inter-node coherency traffic between switch 110 and the ZB bus. PM 112 transfers packets to and from switch 110 and the ZB bus. Generally, the packets are transferred to and from PM 112 and the memory controlled by MC 104.

Although a variety of circuitry may implement PM 112, the example embodiment shown in FIG. 1 utilizes a packet manager which may be a direct memory access (DMA) engine that writes packets received from switch 110 to input queues in the main memory and reads packets from the output queues to the correct interface 120. The particular PM 112 may be comprised of two subsections referred to as input packet manager (PMI) and output packet manager (PMO). Both the PMI and PMO have descriptor engines and caches. These engines may prefetch descriptors and data from main memory as the software releases new descriptors for PM 112 to work on. PM 112 may have support for 32 input and 32 output queue descriptor rings. These queues may be assigned to virtual channels of the HT/SPI-4 interfaces 120 under software control. Additionally, the PMO may also handle scheduling packet flows from two or more output queues that may be sent to the same output virtual channel. Additionally, the PM may have TCP (transmission control protocol) and IP (internet protocol) checksum support for both ingress and egress packets.

NC 110 may perform a number of basic functions. For NC 110 of system 100, NC 110 may perform functions that include acting as a bridge between the ZB bus and HT/SPI-4 interfaces 120. Accesses originated on either side may be translated and sent on to the other. Support for HT configuration may also be supported. The second function may be to implement the distributed shared memory model with a CC-NUMA (cache coherent non-uniform memory access) protocol. Through a remote line directory (RLD), lines may be coherently sent to remote nodes while they are tracked. When lines need to be reclaimed, probes may be issued to retrieve or invalidate them. NC 110 may be responsible for generating any coherent commands to other nodes to complete another operation. Ordering of events may also be taken care of in NC 110.

The HT/SPI-4 (hyper-transport/SPI-4) interfaces 120A–C may comprise ports that are configured as interfaces that allow the system to communicate with other chips using either HT and/or SPI-4 (including SPI-4 phase 2) as the link protocol. In one embodiment there may be two, bidirectional interfaces on the chip, of 16-bits wide and independently capable of acting as an 8/16-bit HT and/or a SPI-4 link. The choice of whether to use a particular interface may be made statically at reset or alternatively by other techniques. The HT protocol may be compliant with version 1.02 of the Hyper-Transport specification. In addition, support may be present or added for the efficient transport of channelized packet data. Packet data herein being referred to the SPI-4 like traffic, which is based on message passing rather than read/write commands. This may be achieved by encapsulating the message packets into HT write commands to special addresses.

Bridge (BR1) 115 interfaces the ZB bus to various system interfaces, including a generic bus. Some examples of interfaces to the BR1 are noted in FIG. 1. In one embodiment for system 100, BR1 includes an interface to a generic bus which may be used to attach the boot ROM (read only memory) and/or a variety of simple peripherals. An SM bus interface may be employed to provide two serial configuration interfaces. The interfaces may provide hardware assistance for simple read and write of slave devices with the system as the bus master. The interface may include one or more DUARTs (dual asynchronous receiver/transmitter) which are serial ports that may provide full-duplex interfaces to a variety of serial devices. A general purpose input/output (GPIO) interface may have a number of pins that are available for general use as inputs, outputs or interrupt inputs. A PCI (peripheral component interconnect) interface may also be present to provide a connection to various PCI peripherals and components.

The system controller and debug unit 119 may provide system level control, status and debugging features for the system 100. These functions may include: reset functions, including a full reset activity by an external reset pin; debug and monitoring functions including system performance counters, a ZB bus watcher of data transfers for I/O and memory controller or L2 cache ECC errors, a programmable trace cache which may conditionally trace ZB bus events and an address trap mechanism; communication and synchronous functions including gathering and distributing interrupts from the HT, PCI, DMA, and external I/O devices to the SB-1 processors; and timing functions for watch dog timeouts and general purpose timing. SCD unit 119 may also include Ethernet interfaces (including gigabit Ethernet interface), JTAG (joint test action group) interface and a data mover using a multi-channel DMA engine to offload data movement and limited CRC (cyclic redundancy check) functions from the processors.

It is to be noted that only three HT/SPI-4 interfaces or ports are shown in system 100 of FIG. 1. However, the actual number of such ports may vary depending on the system employed. Interface 120 may be a high-speed port for the system and may be configured as either a 16-bit HT or a SPI-4 (including SPI-4 phase 2) interface. A variety of techniques may be employed to allow interface 120 to be a port for HT and SPI-4 data transfer. When in the HT mode, interface 120 may serve as either host or targets of an HT chain. In this configuration, the Rx and Tx for the particular interface 120 may be paired together to form a bidirectional HT link. The HT interface may be 1.2 Gbps/wire which results in a bandwidth of approximately 9.2 Gbps per HT link. For SPI-4 mode, the Rx and Tx interfaces may be considered independent. The interface 120 may be minimally clocked at a frequency to support 10 Gbps packet transfer rate (for example 600–800 Mbps/bit depending upon burst size and the desired link rate). Because the SPI-4 interface may be independent they can be oriented in a unidirectional flow. Note that in this configuration the ports may still be considered independent with several packet streams and flow control per interface. Lastly, interfaces 120 may be programmed such that one or more operate as SPI-4 and others in the HT mode. Thus, it is to be noted that the interfaces 120 may be configured in a variety of modes and functions depending on the particular technique of data transfer desired.

Figure 2:
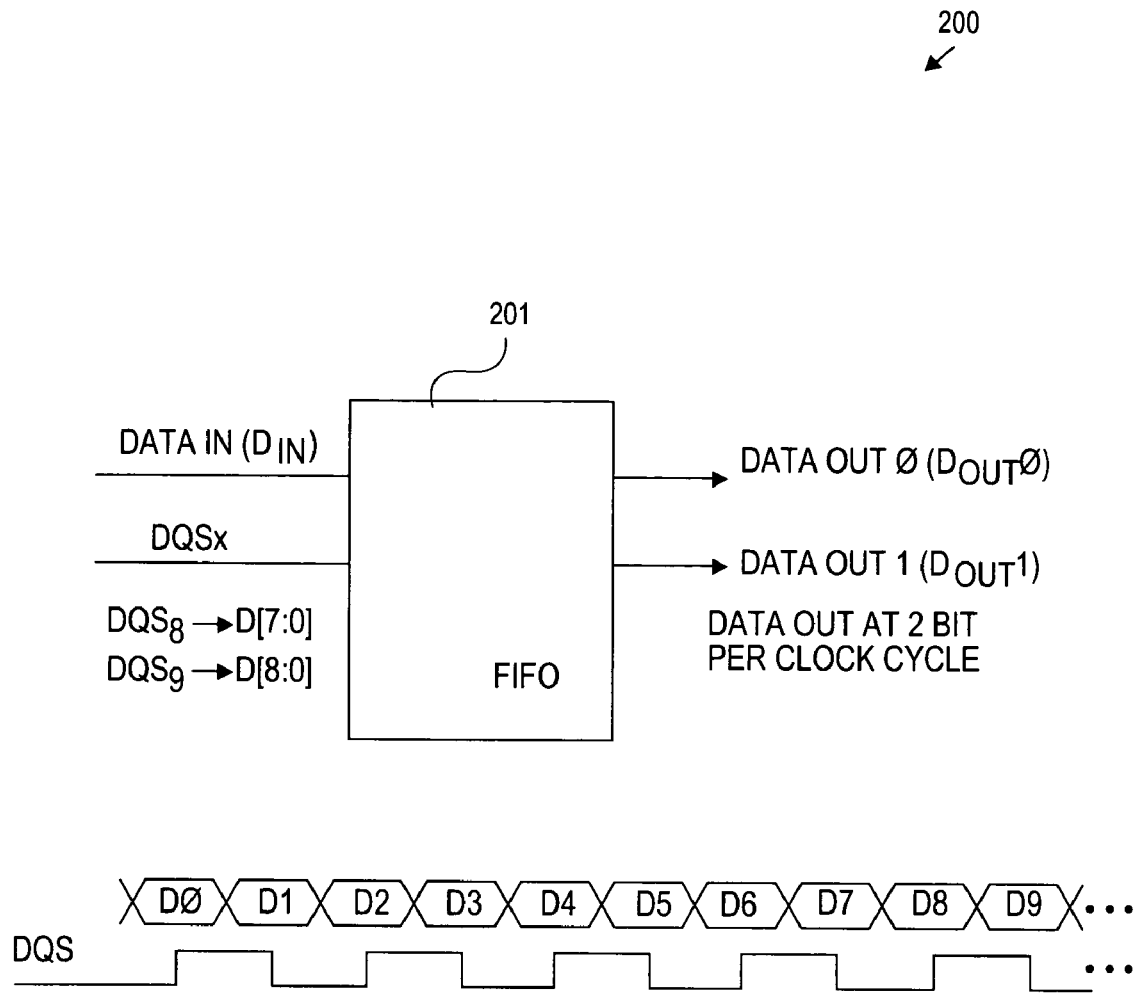
FIG. 2 illustrates a first-in, first-out (FIFO) unit which accepts two strobes to employ two separate data capture mechanisms for the FIFO unit.

Referring to FIG. 2, a data acquisition circuit 200 is shown in which a FIFO (first-in, first-out) unit 201 receives or acquires data noted as DATA IN ($D_{IN}$). FIFO unit 201 also receives a clock signal known as a data strobe (DQSx) to strobe in $D_{IN}$. Strobes for strobing in data from a data source are generally known and a variety of strobing schemes may be used with FIFO 201. In the particular embodiment described, the data being acquired by FIFO 201 originates from a data source such as memory 150 of FIG. 1. Although the data strobe DQSx is typically generated by the data source when data is to be transferred, DQSx may be generated by other components in other embodiments. An appropriate strobe DQSx is generated to correspond to the amount of data bits being strobed in for the strobe phase. Thus, in the particular example embodiment shown in FIG. 2, the FIFO 201 receives $D_{IN}$ and DQSx to effect a data transfer from a data storage source, such as memory 150. Then, FIFO 201 operates to output a pair of bits per clock cycle, in the order the data bits are strobed into FIFO 201.

In the embodiments described, FIFO 201 has the flexibility to switch between strobing schemes, so that FIFO 201 may operate to receive data using different strobes. In the example above, data transmissions of 8-bits and 9-bits per strobe are noted. In the particular embodiment shown in FIG. 2, two different strobes, noted as $DQS_8$ and $DQS_9$ are shown available as input to FIFO 201. Which strobe rate is used depends on the data transfer scheme of the memory being used to input data into FIFO 201. $DQS_8$ is utilized to operate on 8 bits of data input (noted as D[7:0]) for a given data strobe. $DQS_9$ is utilized to operate on 9 bits of data input (noted as D[8:0]) for a given data strobe. In one embodiment, $DQS_8$ or $DQS_9$ may be used to receive data from memory, such as memory 150.

As noted with the timing diagram of DQSx, data bits are clocked into the FIFO unit 201 at the rising edge and at the falling edge for each cycle of DQSx. If the strobe is $DQS_8$, 8 bits are acquired during a single data strobe. Likewise, if the strobe is $DQS_9$, 9 bits are acquired during a single data strobe. Since the data is clocked in at both the rising and falling edges of the DQS strobe, the number of bits clocked in per strobe is determined by the selected DQSx signal. If the strobe $DQS_8$ is selected, a strobe signal strobes in 8 bits (D[7:0]) as input into FIFO unit 201. If the strobe $DQS_9$ is selected, a strobe signal strobes in 9 bits (D[8:0]) as input into FIFO unit 201. Data bits strobed in are output as a data pair $D_{OUT}0$ and $D_{OUT}1$ from FIFO 201. As noted, FIFO 201 selects between either the $DQS_8$ or $DQS_9$ strobe. Which strobe is to be used depends on the number of data bits strobed by a single DQS in the memory device coupled to FIFO 201. Thus, in the example, the strobe signal into FIFO 201 is noted as DQSx, where "x" indicates a particular number of bits received in one data strobe. It is to be noted that in other embodiments DQSx may accept other bit configurations separate from, or in conjunction with, $DQS_8$ and/or $DQS_9$. Thus, circuit 200 may operate using one of a plurality of different strobe signals, depending on the memory configuration for the data input into FIFO 201.

Figure 3:
FIG. 3 is a table illustrating alignment of bits for two different strobes, $DQS_8$ and $DQS_9$, to acquire 38 bits in a strobe phase.

Referring to FIG. 3, table 300 illustrates a situation when 39 bits, bits D[38:0], are processed by a system using $DQS_8$ or $DQS_9$. As noted above in reference to FIG. 1, in one embodiment, a given data channel may transfer 32-bits of data along with 7-bits of ECC (for a total of 39 bits) on a 39-bit bus. The 39 bits from the memory may transfer into FIFO 201 of FIG. 2, using either 8-bit transfer per strobe or 9-bit transfer per strobe. Table 300 shows how the 39-bit bus may be strobed depending on which strobe scheme, $DQS_8$ or $DQS_9$, is used. In the column noted as $DQS_8$, individual strobes DQS0, DQS1, DQS2, DQS3, and DQS4 strobe in respective bits D[7:0], D[15:8], D[23:16], D[31:24], and D[38:32] in each strobe phase of $DQS_8$. Similarly for $DQS_9$, strobes DQS0, DQS1, DQS2 and DQS3 strobe in respective bits D[8:0], D[17:9], D[26:18], and D[35:27] in each strobe phase of $DQS_9$. Bits D[38:36] may be strobed using strobe DQS4, but in the particular example, D[38:36] are ignored with the application of $DQS_9$.

As noted, bits D[8], D[17:16], D[26:24], and D[35:32] are clocked by different strobe signals depending on whether $DQS_8$ or $DQS_9$ is employed by the system. As noted above, generally the strobe is determined by the characteristic of the memory device utilized.

Figure 4:
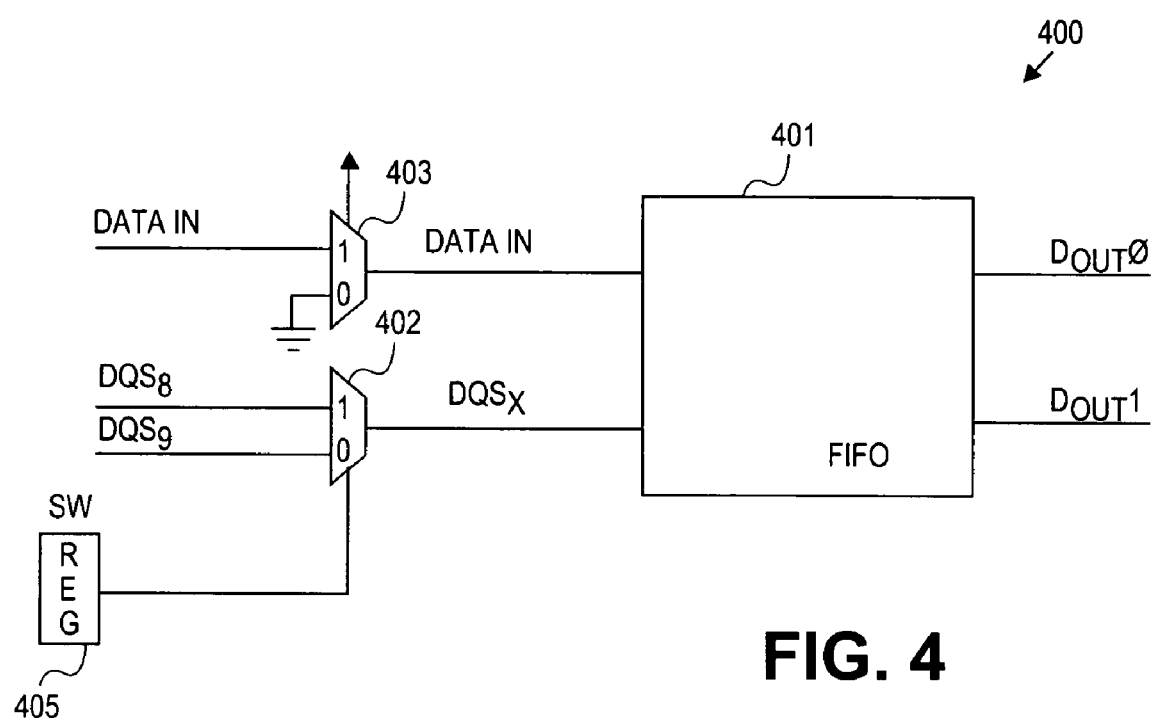
FIG. 4 is a block schematic diagram showing one embodiment of the invention to multiplex two different strobes to allow a FIFO unit to operate utilizing one or the other strobe.

In order to allow for the flexibility of using either $DQS_8$ or $DQS_9$ for two different types of data strobing scheme, FIG. 4 shows a circuit 400 in which a FIFO unit 401 is utilized to acquire the data as input from a data path associated with a given storage device, such as memory 150 of FIG. 1. FIFO 401 is equivalent to FIFO 201 of FIG. 2. In order to allow one or the other data strobe scheme to be used, a multiplexer (MUX) 402 may be employed to select either the $DQS_8$ or $DQS_9$ strobe. The selection as to which strobe signal to pass through to the FIFO 401 may be determined by a MUX select signal, shown obtained from a register 405. Register 405 in one embodiment is a software register in which software is used to program the content of the register. The content of the register 405 determines the select signal for MUX 402 to select either $DQS_8$ or $DQS_9$. The content of register 405 may be fixed or it may be programmable. In one embodiment, register 405 is located within MC 104 of FIG. 1.

Furthermore, in one embodiment, in order to maintain proper phase relationship between the data and the DQS strobe signal, a MUX 403 is inserted in the data path to introduce a delay comparable to a delay introduced by MUX 402 in the DQS signal path. In this manner, a delay incurred by the DQS strobes in transitioning MUX 402 may also be imposed on the data as it transitions through MUX 403. Thus, both the DQS signal path and the data path have comparable delays. As noted with MUX 403, the select signal is set to pass the data to the FIFO 401 at all times. Thus, by utilizing the MUX 402, data strobe to FIFO 401 may be made selectable, so that either $DQS_8$ or $DQS_9$ is used as the strobe for strobing in the data into FIFO 401.

It is to be noted that in a typical application, the system designer that implements a particular memory, or a particular device operating with a particular memory, sets the value in register 405. This allows flexibility in selecting a particular DQS strobe to be sent to the FIFO 401.

Figure 5:
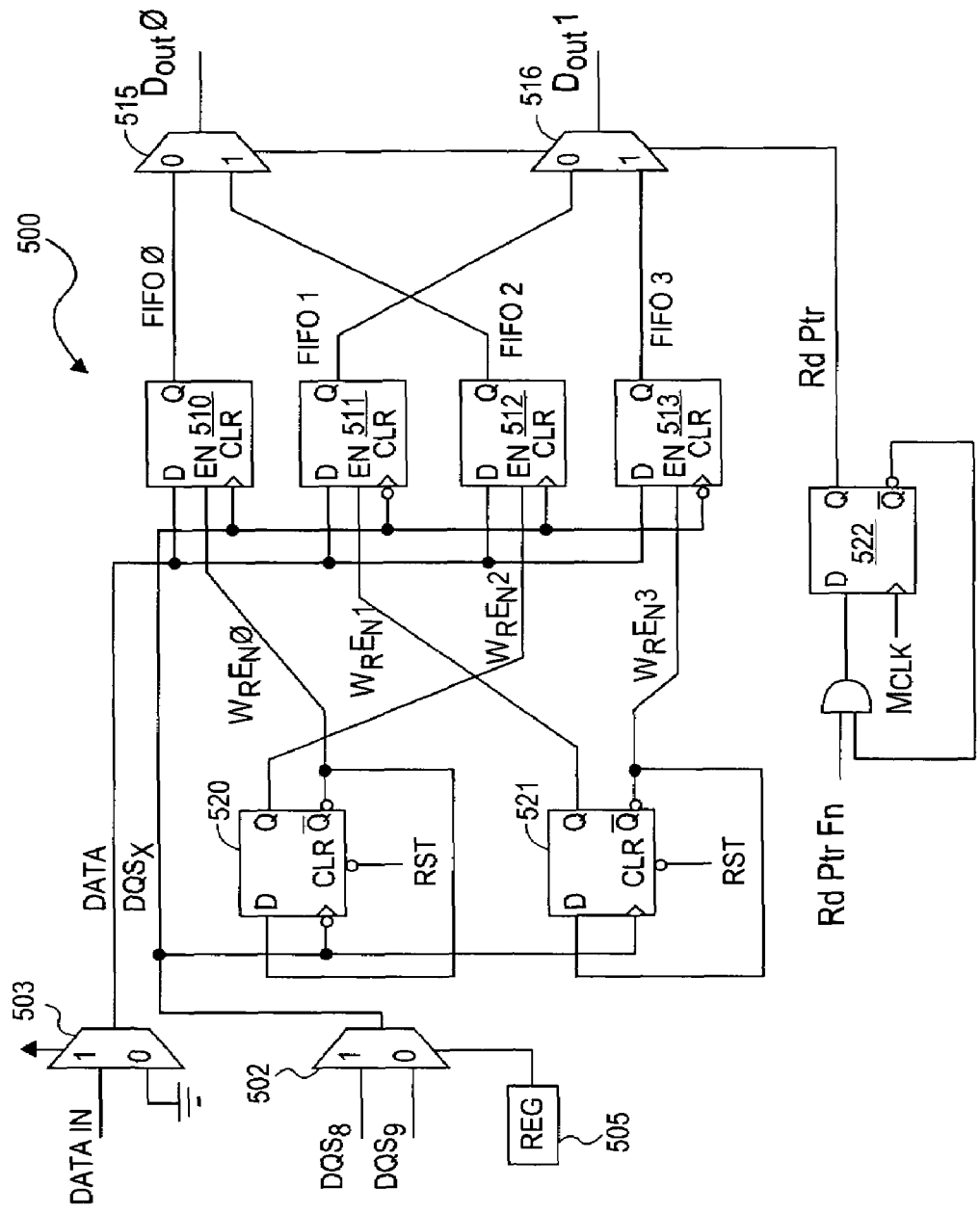
FIG. 5 is a circuit schematic diagram showing one embodiment for implementing the circuit of FIG. 4.

A variety of circuitry may be implemented to provide the switching of a FIFO between strobe sources. One embodiment for practicing the invention is shown in FIG. 5 with the accompanying signal timing illustrated in FIG. 6. At the input to circuit 500, the data is input through MUX 503, while the $DQS_8$ and $DQS_9$ strobes are coupled through MUX 502. The operation of MUXs 502, 503 are respectively equivalent to MUXs 402, 403 of FIG. 4. As with MUX 402, MUX 502 is controlled by a value placed into a register 505.

The FIFO is comprised of latches 510, 511, 512, 513. In the particular example circuit 500, the latches are edge-triggered D-type flip-flops. The DATA input is coupled to the D-input of the latches 510–513. The DQSx signal is coupled to clock the latches 510–513. Note that the inverted clock input at latches 511, 513 causes these two latches 511, 513 to latch the DATA at opposite edges of DQSx signal from latches 510, 512. The DQSx signal is also coupled to clock control latches 520, 521. Again, latch 520 has an inverted clocking input so that the state of the DQSx signal clocks one or the other latch 520, 521. The Q output and the inverted Q output from latches 520, 521 generate separate enable signals to enable latches 510–513, as shown in FIG. 5. The inverted Q outputs from latches 520, 521 are coupled back respectively to the D-input of latches 520, 521 to toggle latches 520, 521. A reset signal RST is coupled to the CLR (clear) input of latches 520, 521.

Latches 520, 521 generate enable signals WrEn0, WrEn1, WrEn2 and WrEn3 to enable corresponding latches 510–513. The outputs of latches 510–513 are respectively noted as FIFO0, FIFO1, FIFO2 and FIFO3. FIFO0 and FIFO2 outputs are coupled through MUX 515, while FIFO1 and FIFO3 outputs are coupled through MUX 516. The output of MUX 515 is noted as Dout0 and MUX 516 outputs Dout1.

MUX 515 and MUX 516 receive a select signal noted as RdPtr (read pointer). The RdPtr signal is toggled so that FIFO0 and FIFO1 are output as Dout0 and Dout1 during one portion of a clock cycle, followed by output of FIFO2 and FIFO3 as Dout1 and Dout2 during another portion of the clock cycle. A latch 522 (a D-type latch in this example) is used to generate the RdPtr signal. Latch 522 uses a clock signal, noted as MCLK in the example, to determine the timing of the RdPtr signal. In one embodiment, the MCLK signal is a master clock signal of an integrated circuit (such as IC of system 100 of FIG. 1) to set the timing of the data output from the FIFOs to the clock domain of the internal bus of the IC. A read pointer enable signal RdPtrEn is used with latch 522 to enable and disable latch 522.

Figure 6:
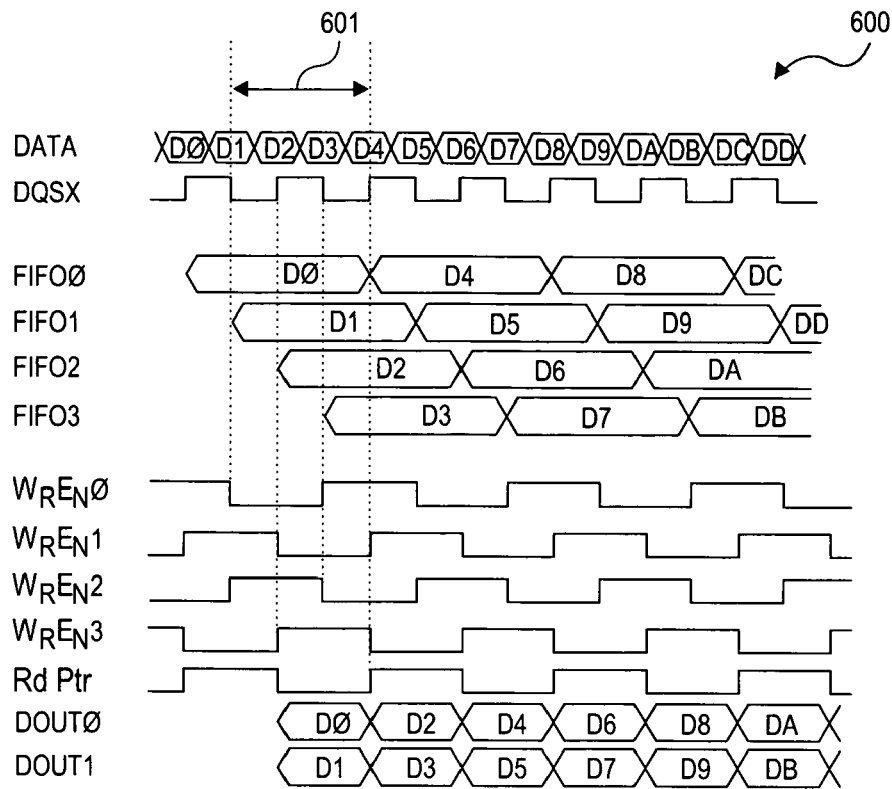
FIG. 6 is a timing diagram for the circuit of FIG. 5.

The operation of the circuit 500 is better understood when viewed along with the timing diagram 600 shown in FIG. 6. In the example, DATA is strobed during a strobe phase by DQSx. In the earlier described example of a 39-bit transfer from memory, the data bits are strobed pursuant to the diagram of FIG. 3, depending on whether $DQS_8$ or $DQS_9$ is used. The first bit D[0] is input to latch 510, D[1] to latch 511, D[2] to latch 512 and D[3] to latch 513. FIFO0–FIFO3 outputs indicate the latching of bits D[0]–D[3]. By the operation of MUXs 515, 516, bits D[0] and D[1] are output as pair of Dout0 and Dout1 during one phase of RdPtr, while D[2] and D[3] are output during the other phase of the RdPtr cycle. Subsequent bits are processed in a similar manner.

The input data bits are strobed during positive and negative transitions of the strobe signal DQS, so that two bits are read for each cycle of DQS. However, since the FIFOs are arranged having 4 separate latches, the FIFO outputs FIFO0-FIFO3 are valid for at least 1½ cycle of DQS (as shown by line 601). This allows Dout0 and Dout1 to remain valid for a longer time per bit than the DATA in. Once D[0] and D[1] are read out, the MUXs 515, 516 toggle to allow D[2] and D[3] to be read out. Subsequently, the next four bits D[4]–D[7] are latched and read out. The WrEn0–WrEn3 signals control the enable timing of FIFO0-FIFO3.

It is to be noted that how the bits are organized depends on whether $DQS_8$ or $DQS_9$ is used. Again, the bit organization for a 39-bit data transfer is noted in FIG. 3. It is appreciated that various other bit configurations may be implemented to strobe in the bits to the FIFOs.

Furthermore, in other embodiments, there may be more than two DQS strobe selections. Accordingly, in FIG. 7, a circuit 700 is shown in which MUX 702, having "n" inputs, selects from a "n" plurality of DQS strobes (shown as DQSm-DQSt). A control signal CNTL may be used for the MUX select. A MUX 703, may be present in the data path to introduce comparable delay as MUX 702 to preserve the phase relationship between the DQS strobe and data. In one embodiment, MUX 703 is also a n-input multiplexer, but in which only one input is used.

Figure 7:
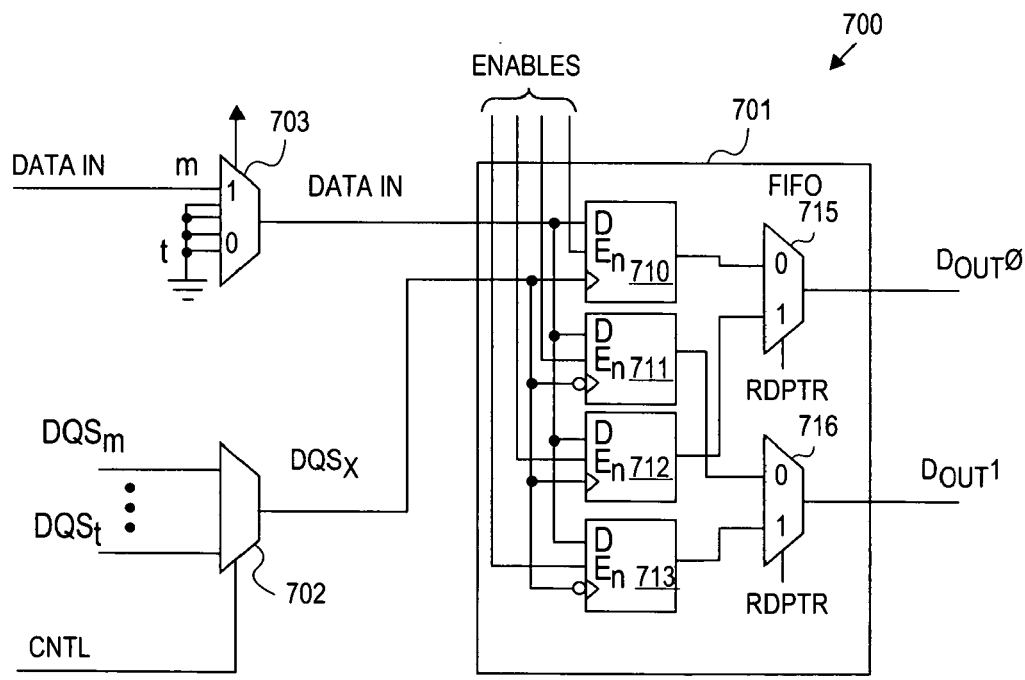
FIG. 7 is a block schematic diagram illustrating another embodiment of the invention in which multiple strobes may be selected to acquire data into a FIFO unit.

In the example circuit of FIG. 7, latches 710, 711, 712, 713 comprise FIFO unit 701. The latches 710–713 operate equivalently to latches 510–513 to latch in and output bits. FIFO MUXs 715 and 716 operate equivalently to MUXs 515, 516 respectively to output pairs of bits from FIFO 701. The control of MUXs 715, 716 may be achieved using similar circuitry as FIG. 5 for generating the RdPtr signal. Furthermore, it is appreciated that enable signals are coupled to latches 710–713. The enabling of the latches 710–713 may be performed equivalently as latches 510–513. It is to be noted that the CNTL signal controlling MUX 502 may be software controlled (such as register 505 of FIG. 5) or it may also be hardwired, allowing a system designer to select different memory strobes to be used.

The invention may be practiced in a number of settings and applications. The embodiments described above implements the invention in a FIFO buffer which receives data from a data storage source, such as a memory device. In reference to FIG. 1, the data receiver FIFOs are located within the IC and in one embodiment, the FIFOs are located where the memory data buses come on-chip. Architecturally, the FIFOs may reside in the MC 104. The memory is located external to the IC in the example embodiment of FIG. 1.

Thus, a scheme to switch a storage device between strobe sources to strobe in data at different strobe rates is described. Although a FIFO, having latches to perform the data latching operation is described in the disclosure, various other storage devices may be utilized. Furthermore, an integrated circuit, such as the integrated circuit of FIG. 1, may have flexibility in allowing a designer to select from a variety of memory devices and usage of memory devices, since the integrated circuit permits usage of different strobes having different strobe rates.

I claim:

1. An apparatus comprising:
a first-in, first-out buffer (FIFO) to strobe in data from a data source based on at least a first strobe signal or a second strobe signal, the data to be buffered for transfer onto a data bus having different timing than the first or second strobe rate, the strobe signals based on a bit transfer rate per strobe of the data source which is to be used to transfer the data to the FIFO, wherein the FIFO includes latches to latch in the data and output pairs of bits based on the timing of the data bus; and
a select circuit to select between the strobe signals, including the first strobe signal and the second strobe signal, depending on the bit transfer rate per strobe of the data source, the first strobe signal to be selected when the data source has a first bit transfer rate per strobe and the second strobe to be selected when the data source has a second bit transfer rate per strobe.

2. The apparatus of claim 1, wherein the select circuit is a multiplexer.

3. The apparatus of claim 1, wherein the select circuit is to receive a select signal from a value stored in a register.

4. The apparatus of claim 1 further including a register to store a programmable value used to select between the first and second strobes.

5. The apparatus of claim 1, wherein the FIFO is comprised of four latches to strobe in four bits of data and output a pair of bits onto the data bus during a first portion of a clock cycle and another pair of bits during a second portion of the clock cycle.

6. The apparatus of claim 1 further including a second select circuit disposed in a data path of the incoming data to introduce delay in the data path to maintain phase relationship between the incoming data and the first or second strobe selected.

7. An integrated circuit comprising:
an interim first-in, first-out buffer (FIFO) to strobe in data from a memory based on a first strobe signal or a second strobe signal, the strobe signals based on a bit transfer rate per strobe of the memory which is to be used to transfer the data to the FIFO; and a select circuit to select between the first strobe signal and the second strobe signal depending on the bit transfer rate per strobe of the memory, the first strobe signal to be selected when the memory has a first bit transfer rate per strobe and the second strobe to be selected when the memory has a second bit transfer rate per strobe.

8. The integrated circuit of claim 7, wherein the select circuit is a multiplexer.

9. The integrated circuit of claim 8, wherein the multiplexer is to receive a select signal from a value stored in a register.

10. The integrated circuit of claim 8 further including a register to store a programmable value to be used by the multiplexer to select between the first and second strobe signals.

11. The integrated circuit of claim 8, wherein the FIFO is comprised of latches to latch in the data and output pairs of bits onto an internal data bus based on timing of the internal data bus.

12. The integrated circuit of claim 8, wherein the FIFO is comprised of four latches to strobe in four bits of data and output a pair of bits onto an internal data bus during a first portion of a clock cycle and another pair of bits during a second portion of the clock cycle.

13. The integrated circuit of claim 8 further including a second multiplexer disposed in a data path of the incoming data to introduce delay in the data path to maintain phase relationship between the incoming data and the first or second strobe selected.

14. A method comprising:

generating a plurality of strobes to accommodate data sources that have different bit transfer rates per strobe, in order to transfer data to a buffer at a bit transfer rate of a particular data source which is coupled to the buffer for data transfer;

selecting one strobe from the plurality of strobes to allow data transfer from the particular data source to the buffer at a bit transfer rate of the particular data source; and receiving incoming data from the particular data source using the selected one strobe to receive the incoming data at the bit transfer rate of the particular data source.

15. The method of claim 14 further including multiplexing the plurality of strobes and using a select signal for selecting the one strobe.

16. The method of claim 15 further including delaying the incoming data to maintain phase relationship between the incoming data and the selected one strobe.

17. The method of claim 16, wherein the receiving incoming data includes latching in the data and outputting pairs of bits based onto an internal data bus based on timing of the data bus.

18. The method of claim 16, wherein the receiving incoming data includes latching to strobe in four bits of data and outputting a pair of bits onto an internal data bus during a first portion of a clock cycle and another pair of bits during a second portion of the clock cycle.

* * * * *